(12) United States Patent
Yum et al.

(10) Patent No.: US 9,014,826 B2
(45) Date of Patent: *Apr. 21, 2015

(54) MOBILE TERMINAL

(71) Applicant: LG Electronics Inc., Seoul (KR)

(72) Inventors: Kwanho Yum, Seoul (KR); Sangoh Kim, Seoul (KR); Bongmun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,298

(22) Filed: Aug. 9, 2013

(65) Prior Publication Data

US 2014/0074296 A1 Mar. 13, 2014

Related U.S. Application Data

(63) Continuation of application No. 12/776,699, filed on May 10, 2010, now Pat. No. 8,509,922.

(30) Foreign Application Priority Data

May 11, 2009 (KR) ........................ 10-2009-0041005

(51) Int. Cl.
*G05B 15/02* (2006.01)
*H04L 12/28* (2006.01)

(52) U.S. Cl.
CPC ............ *G05B 15/02* (2013.01); *H04L 12/2809* (2013.01); *H04L 12/282* (2013.01); *H04L 12/2825* (2013.01); *H04L 2012/2841* (2013.01); *H04L 2012/285* (2013.01)

(58) Field of Classification Search
USPC ............ 700/9, 11, 12, 15, 17, 19, 80, 83, 90, 700/275, 276, 65; 8/137, 158, 159; 68/12.02, 12.12
See application file for complete search history.

(56) References Cited

U.S. PATENT DOCUMENTS

| 6,453,687 | B2 | 9/2002 | Sharood et al. |
| 6,539,570 | B2 * | 4/2003 | Youn et al. ........................ 8/159 |
| 6,778,868 | B2 | 8/2004 | Imamura et al. |
| 6,862,496 | B2 | 3/2005 | Fukuoka et al. |
| 7,096,601 | B2 | 8/2006 | Lyu et al. |

(Continued)

FOREIGN PATENT DOCUMENTS

| CN | 1343806 | 4/2002 |
| CN | 1504934 A | 6/2004 |

(Continued)

OTHER PUBLICATIONS

PCT International Search Report dated Feb. 1, 2011 issued in Application No. PCT/KR2010/002929.

(Continued)

*Primary Examiner* — Charles Kasenge
(74) *Attorney, Agent, or Firm* — Ked & Associates, LLP (57) ABSTRACT

A mobile terminal includes a wireless communication unit for collecting external information or transmitting recommended operation information to a home appliance, and a controller for generating the recommended operation information for the home appliance based on the collected external information. The mobile terminal may provide customized recommended operation information for each home appliance without separately including a device for controlling one or more home appliances provided in a home.

6 Claims, 7 Drawing Sheets

(56) References Cited

U.S. PATENT DOCUMENTS

| | | | |
|---|---|---|---|
| 7,174,227 B2 | 2/2007 | Kobayashi et al. | |
| 7,274,975 B2 | 9/2007 | Miller | |
| 7,373,737 B2 | 5/2008 | Lyu et al. | |
| 7,383,644 B2 | 6/2008 | Lyu et al. | |
| 7,621,012 B2 | 11/2009 | Kim | |
| 7,808,368 B2 | 10/2010 | Ebrom et al. | |
| 7,814,597 B2 | 10/2010 | Fife et al. | |
| 7,925,976 B2 | 4/2011 | Shin et al. | |
| 8,060,908 B2 | 11/2011 | Bountour et al. | |
| 8,166,590 B2 | 5/2012 | Ashrafzadeh et al. | |
| 8,217,752 B2 | 7/2012 | Kwon et al. | |
| 2001/0010516 A1 | 8/2001 | Roh et al. | |
| 2001/0025392 A1* | 10/2001 | Youn et al. | 8/159 |
| 2002/0000092 A1* | 1/2002 | Sharood et al. | 62/127 |
| 2002/0010515 A1 | 1/2002 | Fukuoka et al. | |
| 2002/0032491 A1 | 3/2002 | Imamura et al. | |
| 2002/0040505 A1 | 4/2002 | Tanaka et al. | |
| 2002/0066279 A1 | 6/2002 | Kiyomatsu | |
| 2002/0116959 A1 | 8/2002 | Ohta et al. | |
| 2003/0007104 A1 | 1/2003 | Hoshino et al. | |
| 2003/0103088 A1 | 6/2003 | Dresti et al. | |
| 2003/0164754 A1 | 9/2003 | Roseen | |
| 2005/0050647 A1 | 3/2005 | Tanaka et al. | |
| 2005/0109070 A1 | 5/2005 | Kobayashi et al. | |
| 2005/0138835 A1 | 6/2005 | Lyu et al. | |
| 2005/0140506 A1 | 6/2005 | Oh et al. | |
| 2005/0160185 A1 | 7/2005 | Matsuura et al. | |
| 2005/0200598 A1 | 9/2005 | Hayes et al. | |
| 2006/0087428 A1 | 4/2006 | Wolfe et al. | |
| 2006/0096303 A1 | 5/2006 | Kavounas | |
| 2006/0150120 A1 | 7/2006 | Dresti et al. | |
| 2006/0161865 A1 | 7/2006 | Scott et al. | |
| 2006/0174641 A1 | 8/2006 | Liu et al. | |
| 2006/0225301 A1 | 10/2006 | Lyu et al. | |
| 2006/0225302 A1 | 10/2006 | Lyu et al. | |
| 2006/0256132 A1 | 11/2006 | Shin et al. | |
| 2006/0259864 A1 | 11/2006 | Klein et al. | |
| 2007/0116427 A1 | 5/2007 | Youn | |
| 2007/0132579 A1 | 6/2007 | Kim | |
| 2007/0143304 A1 | 6/2007 | Min | |
| 2007/0152048 A1 | 7/2007 | Jung et al. | |
| 2007/0152076 A1 | 7/2007 | Chiang et al. | |
| 2007/0220907 A1 | 9/2007 | Ehlers | |
| 2008/0017221 A1 | 1/2008 | Fife et al. | |
| 2008/0027816 A1 | 1/2008 | Han et al. | |
| 2008/0042868 A1* | 2/2008 | Lee et al. | 340/825.22 |
| 2008/0053163 A1 | 3/2008 | Park et al. | |
| 2008/0066475 A1 | 3/2008 | Cho et al. | |
| 2009/0090127 A1 | 4/2009 | Do | |
| 2010/0205819 A1 | 8/2010 | Ashrafzadeh et al. | |
| 2010/0205820 A1 | 8/2010 | Ashrafzadeh et al. | |
| 2010/0205823 A1 | 8/2010 | Ashrafzadeh et al. | |
| 2010/0205824 A1 | 8/2010 | Ashrafzadeh et al. | |
| 2010/0205825 A1 | 8/2010 | Ashrafzadeh et al. | |
| 2010/0205826 A1 | 8/2010 | Ashrafzadeh et al. | |
| 2010/0283573 A1 | 11/2010 | Yum et al. | |

FOREIGN PATENT DOCUMENTS

| | | |
|---|---|---|
| CN | 101329091 A | 12/2008 |
| KR | 10-2001-0103481 A | 11/2001 |
| KR | 10-2004-0032649 | 4/2004 |
| KR | 10-0538623 B1 | 12/2005 |
| KR | 10-0710353 B1 | 4/2007 |
| KR | 10-2008-0041971 A | 5/2008 |
| KR | 10-0838582 B1 | 6/2008 |

OTHER PUBLICATIONS

U.S. Office Action issued in U.S. Appl. No. 12/776,699 dated Apr. 6, 2012.

U.S. Office Action issued in U.S. Appl. No. 12/776,699 dated Sep. 17, 2012.

European Search Report issued in EP Application No. 10775074.7 dated Feb. 7, 2013.

Database WPI Week 200454 Thomson Scientific, Long, GB AN 2004-559598 XP002691172 (KR10-2004-0032649) (English abstract).

Chinese Office Action issued in Chinese Application No. 201080023521.9 dated Aug. 26, 2013.

Chinese Office Action dated Aug. 21, 2014 issued in Application No. 201080023521.9.

Russian Office Action dated May 23, 2014 issued in Application No. 2011150252.

* cited by examiner

| operation mode | operation conditions |
|---|---|
| centralized operation or distributed operation | number/locations/motions of residents |
| dehumidifying operation | humidity |
| sleep operation | night |
| air-conditioningitis avoidance operation | midsummer |
| low power consumption operation | low outdoor temperature |

FIG. 6

| adjustment mode | adjustment conditions |
|---|---|
| dryness level adjustment | rainy season/winter ⇒ high spin-dry |
| noise level adjustment | night ⇒ low-noise spin-dry |
| low power consumption operation | summer |

MOBILE TERMINAL

CROSS-REFERENCE TO RELATED APPLICATION

This application is a continuation of application Ser. No. 12/776,699 filed on May 10, 2010, now U.S. Pat. No. 8,509,922, which claims the benefit of Korean Application No. 10-2009-0041005, filed on May 11, 2009, in the Korean Intellectual Property Office, the disclosure of which is incorporated herein by reference.

BACKGROUND OF THE INVENTION

1. Field of the Invention

The present invention relates to a mobile terminal that provides recommended operation information for a home appliance.

2. Description of the Related Art

Recently, home network technologies have been developed. A home network signifies a network in which a variety of home appliances are interconnected to enable the user to enjoy a convenient, safe and economical life service at any time inside and outside of a home. With the advance of digital signal processing technologies, refrigerators, washing machines, etc. have been gradually digitized, home appliance operating system technologies and high-speed multimedia communication technologies have been intensively deployed on digital home appliances, and a new type of information home appliance has appeared. Therefore, the home network has been developed still further.

A home network system constructed in a home includes a master device that is an electric appliance capable of controlling the operation of each home appliance or monitoring the state thereof, and one or more home appliances each having a function of responding to a request from the master device and a function of notifying information about a variation in the state thereof.

However, the construction of the above-mentioned home network system encounters a problem that a separate master device capable of controlling the operation of each home appliance or monitoring the state thereof must be provided separately.

SUMMARY OF THE INVENTION

Therefore, the present invention has been made in view of the above problems, and it is an object of the present invention to provide a mobile terminal which is capable of providing customized recommended operation information for each home appliance without separately including a device for controlling each home appliance.

It is another object of the present invention to provide a mobile terminal which is capable of providing information about foods stored in a refrigerator among home appliances.

It is a further object of the present invention to provide a mobile terminal which is capable of selectively controlling any one of a plurality of home appliances.

In accordance with an aspect of the present invention, the above and other objects can be accomplished by the provision of a mobile terminal including a wireless communication unit for collecting external information or transmitting recommended operation information to a home appliance, and a controller for generating the recommended operation information for the home appliance based on the collected external information.

In accordance with another aspect of the present invention, there is provided a mobile terminal including a camera unit for collecting images of foods stored in a refrigerator, a controller for generating information about the foods stored in the refrigerator based on external information including the collected images, and a display unit for displaying the generated food information on a screen.

In accordance with a further aspect of the present invention, there is provided a mobile terminal including a display unit for displaying a home appliance selection picture including a plurality of home appliance images, and a controller for controlling the display unit to rotate the home appliance images when a specific one of the home appliance images is selected, and display the specific home appliance image selected after the rotation distinguishably from the other home appliance images when the specific home appliance image is selected after the rotation.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts. It is to be noted that the suffixes of constituent elements used in the following description, such as "module" and "unit", are simply used by considering the ease of writing this specification, but do not have any particular importance or role. Accordingly, the terms "module" and "unit" can be used interchangeably.

Figure 1:
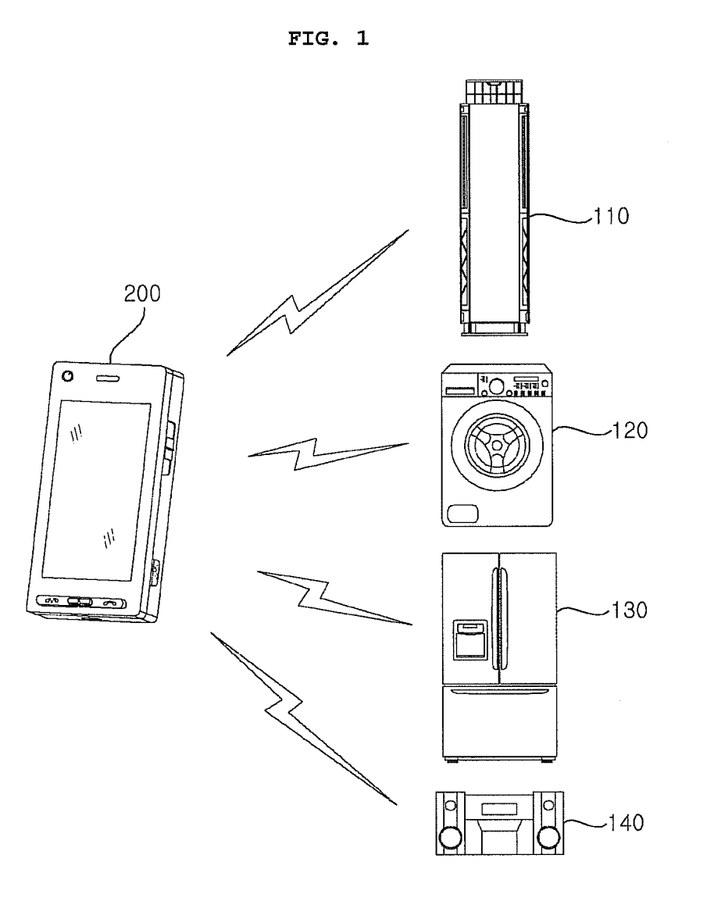
FIG. 1 is a schematic view of a home appliance control system using a mobile terminal according to the present invention.

FIG. 1 is a schematic view of a home appliance control system using a mobile terminal according to the present invention.

Referring to FIG. 1, the home appliance control system using the mobile terminal according to the present invention includes the mobile terminal, denoted by reference numeral

200, a first home appliance (for example, an air conditioner) 110, a second home appliance (for example, a washing machine) 120, a third home appliance (for example, a refrigerator) 130, and a fourth home appliance (for example, a stereo) 140.

The mobile terminal 200 includes a storage unit for storing conditions set for each of one or more home appliances 110, 120, 130 and 140 provided in a home, a wireless communication unit for receiving external information, a controller for generating recommended operation information for each home appliance with reference to the external information, and a short-range wireless communication unit for transmitting the generated recommended operation information to each home appliance.

Figure 2:
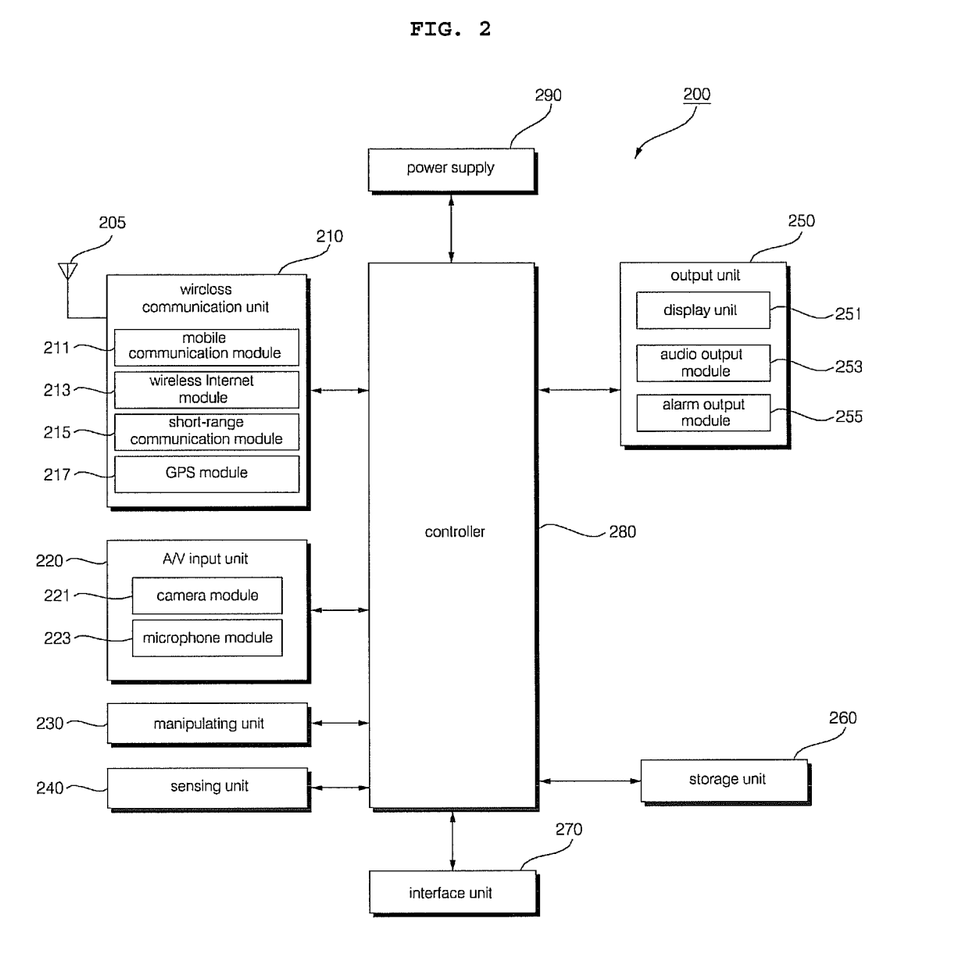
FIG. 2 is a block diagram of a mobile terminal according to an exemplary embodiment of the present invention.

FIG. 2 is a block diagram of a mobile terminal according to an exemplary embodiment of the present invention.

Referring to FIG. 2, the mobile terminal 200 according to the present invention may include a wireless communication unit 210, an audio/video (A/V) input unit 220, a manipulating unit 230, a sensing unit 240, an output unit 250, a storage unit 260, an interface unit 270, a controller 280, and a power supply 290. If necessary, when implemented in actual applications, two or more of these constituent elements may be combined into one constituent element or one thereof may be subdivided into two or more constituent elements.

The wireless communication unit 210 may include a mobile communication module 211, a wireless Internet module 213, a short-range communication module 215, and a global position system (GPS) module 217.

The mobile communication module 211 transmits/receives radio signals to/from at least one of a base station, an external terminal and a server over a mobile communication network. The radio signals may include a voice call signal, a video telephony call signal or various forms of data based on text/multimedia message transmission/reception.

The wireless Internet module 213 refers to a module for wireless Internet access. This module may be installed inside or outside of the mobile terminal 200.

The wireless Internet module 213 may receive external information including at least one of weather information, time information, season information, resident information, humidity information and temperature information.

Also, the wireless Internet module 213 may download recommended operation information generation conditions to be stored in the storage unit 260.

The short-range communication module 215 refers to a module for short-range communication. For example, short-range communication technologies may include Bluetooth, radio frequency identification (RFID), infrared data association (IrDA), ultra wideband (UWB), and ZigBee.

Also, the short-range communication module 215 may receive state information from each home appliance in a home using, for example, Bluetooth. For example, state information from a refrigerator may include at least one of an expiration date of a food, a storage period of the food, a freezing chamber temperature, a refrigerating chamber temperature, an outdoor air temperature, door opening/closing information, operation diagnosis information, and an error content.

In addition, the short-range communication module 215 may transmit recommended operation information generated by the controller 280 to a corresponding home appliance using, for example, Bluetooth.

The global position system (GPS) module 217 receives location information from a plurality of GPS satellites.

The A/V input unit 220 is configured to input an audio signal or video signal. The A/V input unit 220 may include a camera module 221 and a microphone module 223.

The camera module 221 processes frames of a still image or moving image acquired by an image sensor in a video call mode or image capture mode. The processed image frames may be displayed on a display unit 251.

The image frames processed by the camera module 221 may be stored in the storage unit 260 or externally transmitted via the wireless communication unit 210. Two or more camera modules 221 may be provided depending on embodiments of the configuration of the terminal.

Also, images of foods stored in a refrigerator may be acquired through the camera module 221. Also, images of laundry put in a washing machine may be acquired through the camera module 221. Also, information about the number, locations, motions, etc. of residents may be acquired through the camera module 221.

The microphone module 223 receives an external sound signal through a microphone in a call mode, a recording mode, a voice recognition mode, or the like and processes the received sound signal to convert it into electrical audio data. In the call mode, the converted audio data may be converted into that of a format transmittable to a mobile communication base station through the mobile communication module 211 and then outputted to the mobile communication base station. Various noise removal algorithms may be employed in the microphone module 223 to remove noise generated in the course of receiving the external sound signal.

The manipulating unit 230 generates key input data that the user inputs to control the operation of the terminal. The manipulating unit 230 may include a key pad, a dome switch, a touch pad (static pressure/capacitance), a jog wheel, a jog switch, and a finger mouse.

In particular, the touch pad and the display unit 251 to be described later may constitute a layered structure, which may be called a touch screen.

That is, the manipulating unit 230 may input control conditions to be stored in the storage unit 260 by the control of the operation of the terminal by the user.

The sensing unit 240 senses the current state of the mobile terminal 200, such as the open/closed state of the mobile terminal 200, the location of the mobile terminal 200 or the presence or absence of user contact with the mobile terminal 200, and generates a sense signal for control of the operation of the mobile terminal 200 as a result of the sensing. For example, in the case where the mobile terminal 200 is a slide phone, the sensing unit 240 may sense whether the slide phone is open or closed.

In addition, the sensing unit 240 may perform a sensing function associated with whether the power supply 290 supplies power or whether the interface unit 270 is coupled with an external device.

The output unit 250 is provided to output an audio signal, a video signal or an alarm signal. To this end, the output unit 250 may include the display unit 251, an audio output module 253, and an alarm output module 255.

The display unit 251 displays and outputs information processed in the mobile terminal 200. For example, when the mobile terminal 200 is in the call mode, the display unit 251 may display a user interface (UI) or graphic user interface (GUI) associated with a call. When the mobile terminal 200 is in the video call mode or image capture mode, the display unit 251 may display captured or received images, respectively or simultaneously, and also displays a UI or GUI.

On the other hand, in the case where the display unit 151 and the touch pad are layered to constitute the touch screen as stated above, the display unit 251 may also be used as an input device as well as an output device. The display unit 251 may include at least one of a liquid crystal display, a thin film transistor-liquid crystal display, an organic light-emitting diode display, a flexible display and a three-dimensional (3D) display. The mobile terminal 200 may include two or more display units 251 according to its desired implementation.

The audio output module 253 outputs audio data received from the wireless communication unit 210 or stored in the storage unit 260 in a call signal reception mode, a call mode, a recording mode, a voice recognition mode, a broadcast reception mode, or the like. The audio output module 253 also outputs sound signals related to particular functions performed by the mobile terminal 200, for example, a call signal reception sound, a message reception sound, etc. This audio output module 253 may include a speaker and a buzzer.

The alarm output module 255 outputs a signal to notify the user of occurrence of an event in the mobile terminal 200. The event occurring in the mobile terminal 200 may be, for example, call signal reception, message reception or key signal input. The alarm output module 255 may also output a signal in any form other than an audio signal or video signal to notify the user of occurrence of an event in the mobile terminal 200. For example, the alarm output module 255 may output a signal in the form of a vibration. When a call signal is received or when a message is received, the alarm output module 255 may output a vibration to notify the user of such a situation. Alternatively, when a key signal is inputted, the alarm output module 255 may output a vibration as a feedback for the key signal input. This vibration output may enable the user to recognize occurrence of an event. Of course, the signal for event occurrence notification may also be outputted through the display unit 251 or audio output module 253.

The storage unit 260 may store programs for processing and control of the controller 280 and may also function to temporarily store input/output data.

The storage unit 260 may include at least one type of storage media including a flash memory type, a hard disk type, a multimedia card micro type, a card type memory (for example, an SD or XD memory), a random access memory (RAM), and a read-only memory (ROM). The mobile terminal 200 may also manage a Web storage that performs the storage function of the storage unit 260 on the Internet.

The interface unit 270 acts as an interface between the mobile terminal 200 and all external devices connected to the mobile terminal 200. The external devices connected to the mobile terminal 200 may include, for example, a wired/wireless headset, an external charger, a wired/wireless data port, a memory card socket, a SIM/UIM card socket, an audio input/output (I/O) terminal, a video I/O terminal, and an earphone. The interface unit 270 may receive data transmitted from the external devices and transfer the received data or power to each internal component of the mobile terminal 200 or transmit internal data of the mobile terminal 200 to the external devices.

The controller 280 typically controls the operation of each of the above-stated components of the mobile terminal 200, so as to control the overall operation of the mobile terminal 200. For example, the controller 280 may perform control and processing associated with a voice call, data communication, and a video call.

Also, the controller 280 generates recommended operation information for each home appliance based on collected external information.

At this time, the controller 280 may collect the external information through the wireless Internet module 213 and generate the recommended operation information based on the collected external information.

On the other hand, the controller 280 may generate the recommended operation information based on external information inputted by the user or prestored in the mobile terminal 200. At this time, the external information may include at least one of weather information, time information, season information, resident information, humidity information and temperature information and be prestored in, for example, a tabular database. For example, the external information may be set from midnight to six AM at night.

Meanwhile, the recommended operation information may not only be generated by the mobile terminal 200, but also be generated by a wireless Internet server and provided to the mobile terminal 200.

Also, the controller 280 may generate information about foods stored in a refrigerator based on external information including images of the foods. The food information may include at least one of an image, name, current date, storage date, elapsed period, expiration date and barcode information of a selected one of the foods stored in the refrigerator.

The display unit 251 may display the recommended operation information or display the food information.

For example, in the case where a home appliance is an air conditioner, the controller 280 may generate recommended operation information to allow the air conditioner to perform a centralized operation or distributed operation, based on resident information including at least one of the number of residents and the location and motion of each resident, as external information. Also, the controller 280 may collect indoor humidity information as external information and generate recommended operation information to allow the air conditioner to perform a dehumidifying operation, based on the collected indoor humidity information. Also, the controller 280 may collect time information as external information and generate recommended operation information to allow the air conditioner to perform a sleep operation at a specific time, based on the collected time information. Also, the controller 280 may collect indoor temperature information as external information and generate recommended operation information to allow the air conditioner to perform a low power consumption operation depending on an indoor temperature, based on the collected indoor temperature information.

For another example, in the case where a home appliance is a washing machine, the controller 280 may collect current humidity information as external information and generate recommended operation information to allow the washing machine to adjust the level of dryness thereof, based on the collected current humidity information. Also, the controller 280 may collect current temperature information as external information and generate recommended operation information to allow the washing machine to adjust the level of dryness thereof, based on the collected current temperature information. Also, the controller 280 may generate recommended operation information to allow the washing machine to adjust the level of noise thereof, with reference to time information. Also, the controller 280 may generate recommended operation information to allow the washing machine to perform a low power consumption operation, with reference to season information.

As another example, in the case where a home appliance is a refrigerator, the controller 280 may preset an expiration date of a specific food to be stored in the refrigerator according to the user's setting and output an expiration date notification message through the display unit 251 or other output modules of the output unit 250 when the expiration date is reached.

Also, for example, in the case where a home appliance is a refrigerator, the controller 280 may receive state information including door opening/closing information from the refrigerator at a set period, check a door opening/closing history for a set period of time, and transmit a notification message to a preset different mobile terminal when the checking result indicates that there is no door opening/closing for the set time period.

Also, for example, in the case where a home appliance is a refrigerator, the controller 280 may generate recommended operation information for the refrigerator based on external information including at least one of weather information, time information, season information, outdoor temperature information, indoor temperature information and indoor humidity information.

The power supply 290, under the control of the controller 280, receives external power or internal power and supplies power necessary for the operation of each constituent element.

The constituent elements of the mobile terminal related to the present invention have been described in terms of the functionality of the mobile terminal. Hereinafter, the constituent elements of the mobile terminal related to the present invention will be described in detail in terms of the outer appearance of the mobile terminal with reference to FIG. 3. For convenience of description, in the following description, it will be assumed that the mobile terminal is a mobile terminal of a bar type including a front touch screen, among mobile terminals of various types including a folder type, the bar type, a swing type and a slide type. However, it will be understood that the present invention is not limited to the bar type mobile terminal, but may be applied to mobile terminals of all types including the aforementioned types.

Figure 3:
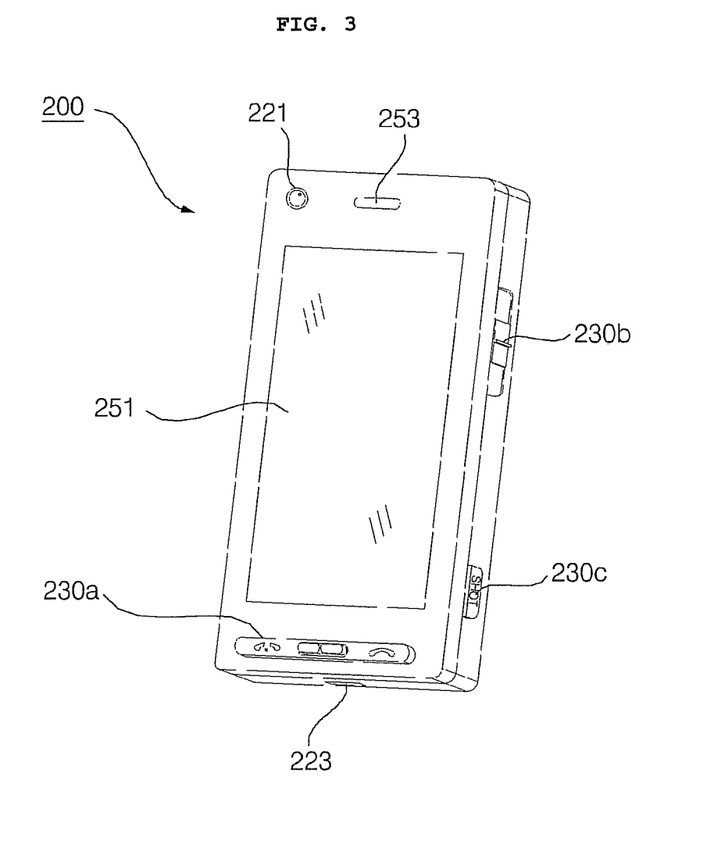
FIG. 3 is a front perspective view of a mobile terminal according to one embodiment of the present invention.

FIG. 3 is a front perspective view of a mobile terminal according to one embodiment of the present invention. Referring to FIG. 3, a case constituting the outer appearance of the mobile terminal 200 is formed by a front case and a rear case. A variety of electronic components are built in a space defined by the front case and the rear case. At least one intermediate case may be additionally disposed between the front case and the rear case.

The display unit 251, the audio output module 253, the camera module 221, and a first manipulating unit 230*a* may be disposed in a body, more particularly the front case. A second manipulating unit 230*b*, a third manipulating unit 230*c*, and the microphone module 223 may be disposed on side surfaces of the rear case.

The display unit 251 may include a liquid crystal display (LCD), an organic light-emitting diode (OLED) display, or the like to visually express information. A touch pad may be overlaid on the display unit 251 in a layered manner, so that the display unit 251 may operate as a touch screen to enable the input of information by the user's touch.

The audio output module 253 may be implemented in the form of a receiver or speaker.

The camera module 221 may be implemented appropriately to capture an image of the user or the like or a moving image. The microphone module 223 may be implemented in an appropriate form to input the user's voice or other sounds.

The first to third manipulating units 230*a*, 230*b* and 230*c* may be collectively referred to as a 'manipulating portion', which is the manipulating unit 230, and may adopt any method as long as it has a tactile manner that allows the user to manipulate the manipulating units 230*a*, 230*b* and 230*c* while receiving tactile feedback.

For example, the manipulating unit 230 may be implemented with a dome switch or touch pad that can input a command or information by the user's pushing or touching or implemented in a wheel or jog scheme in which a key is rotated or in a joystick scheme. In terms of functionality, the first manipulating unit 230*a* may input commands such as START, END and SEND, and the second manipulating unit 230*b* may input operation mode selection, etc. The third manipulating unit 230*c* may operate as a hot-key to activate a special function in the mobile terminal 200.

The mobile terminal described in this specification may include, for example, a mobile phone, a smart phone, a notebook computer, a digital broadcasting terminal, a personal digital assistant (PDA), a portable multimedia player (PMP), or the like.

Figure 4:
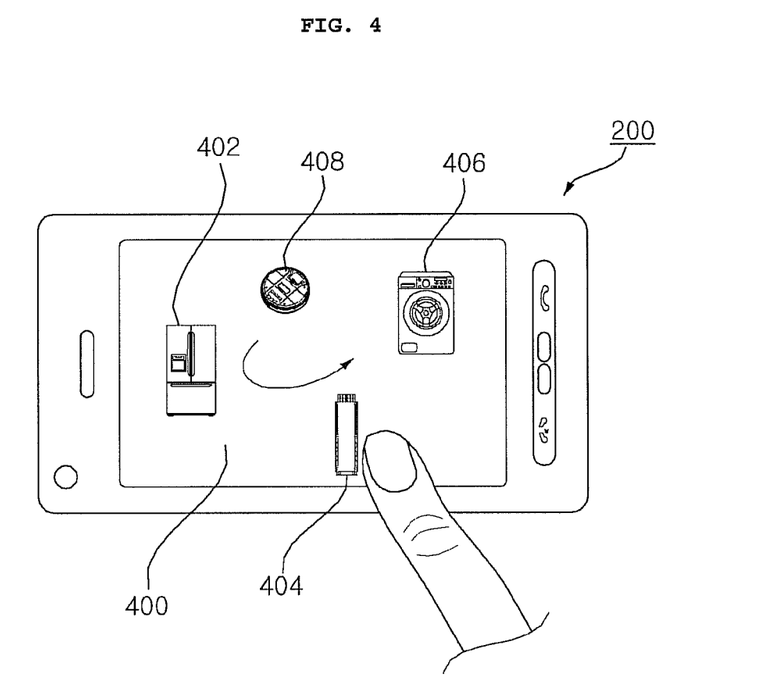
FIG. 4 is a view illustrating a home appliance selection picture according to one embodiment of the present invention.

FIG. 4 illustrates a home appliance selection picture according to one embodiment of the present invention.

Referring to FIG. 4, a home appliance selection picture 400 according to the present invention includes a first home appliance image 402, a second home appliance image 404, a third home appliance image 406, and a fourth home appliance image 408.

The mobile terminal according to the present invention may display a home appliance selection picture including a plurality of home appliance images, rotate the home appliance images when a specific one of the home appliance images is selected, and display the specific home appliance image selected after the rotation distinguishably from the other home appliance images when the specific home appliance image is selected after the rotation.

At this time, the home appliance image selected after the rotation may be enlarged and displayed.

For example, the mobile terminal according to the present invention may rotate the home appliance images elliptically when the user selects a specific one of the home appliance images through the home appliance selection picture 400, and determine that the specific home appliance has been finally selected when the user re-selects the selected home appliance image.

Figure 5:
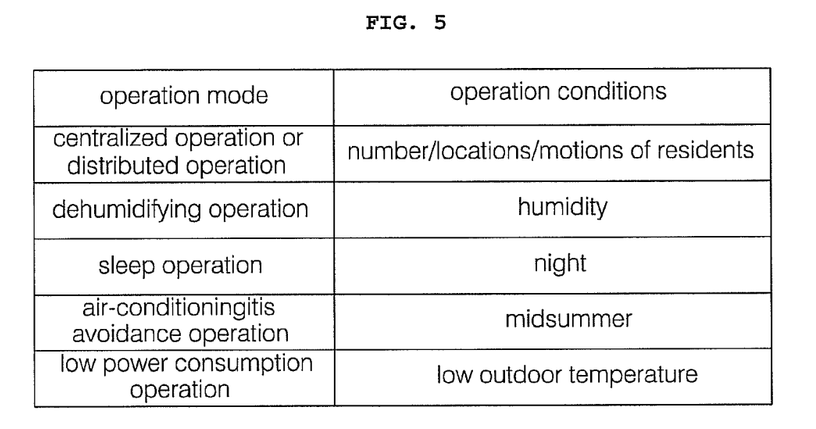
FIG. 5 is a view illustrating recommended operation information generation conditions preset in a mobile terminal when a home appliance is an air conditioner.

FIG. 5 illustrates recommended operation information generation conditions preset in a mobile terminal when a home appliance is an air conditioner.

Referring to FIG. 5, the mobile terminal according to the present invention allows the air conditioner to perform a centralized operation or distributed operation, with reference to the number, locations, motions, etc. of residents. At this time, the mobile terminal may acquire information about the number, locations, motions, etc. of residents by receiving image information collected by a camera module provided in the air conditioner. Alternatively, information about the number, locations, motions, etc. of residents may be acquired by the camera module provided in the mobile terminal.

Also, the mobile terminal according to the present invention allows the air conditioner to perform a dehumidifying operation, for example, in a rainy season, with reference to an indoor humidity.

Also, the mobile terminal according to the present invention allows the air conditioner to perform a sleep operation at a specific time, for example, at a preset time of night.

Also, the mobile terminal according to the present invention allows the air conditioner to perform an air-conditioningitis avoidance operation in a specific season, for example, in a preset period of midsummer.

Also, the mobile terminal according to the present invention allows the air conditioner to perform a low power consumption operation when an outdoor temperature is a preset low temperature.

On the other hand, the mobile terminal according to the present invention receives an indoor temperature from the air conditioner, receives an outdoor temperature through the wireless Internet module, and allows the air conditioner to perform a temperature control operation to make the difference between the indoor temperature and the outdoor temperature less than or equal to a preset value.

Figure 6:
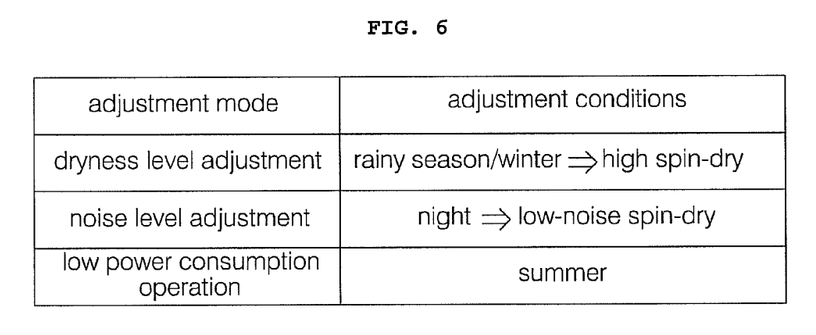
FIG. 6 is a view illustrating recommended operation information generation conditions preset in a mobile terminal when a home appliance is a washing machine.

FIG. 6 illustrates recommended operation information generation conditions preset in a mobile terminal when a home appliance is a washing machine.

Referring to FIG. 6, the mobile terminal according to the present invention allows the washing machine to adjust the level of dryness thereof to high spin-dry in a preset period of rainy season or winter.

Also, the mobile terminal according to the present invention allows the washing machine to perform a low-noise spin-dry operation at a preset time of night.

Also, the mobile terminal according to the present invention allows the washing machine to perform a low power consumption operation in a preset period of summer.

On the other hand, the mobile terminal according to the present invention receives images of laundry put in the washing machine, collected by a camera module provided in the washing machine, determines the amount of the laundry, the quality of the laundry, the level of water in the washing machine, etc. based on the received images, and allows the washing machine to be controlled based on the determined laundry amount, laundry quality, water level, etc. Alternatively, images of laundry put in the washing machine may be acquired by the camera module provided in the mobile terminal.

Figure 7:
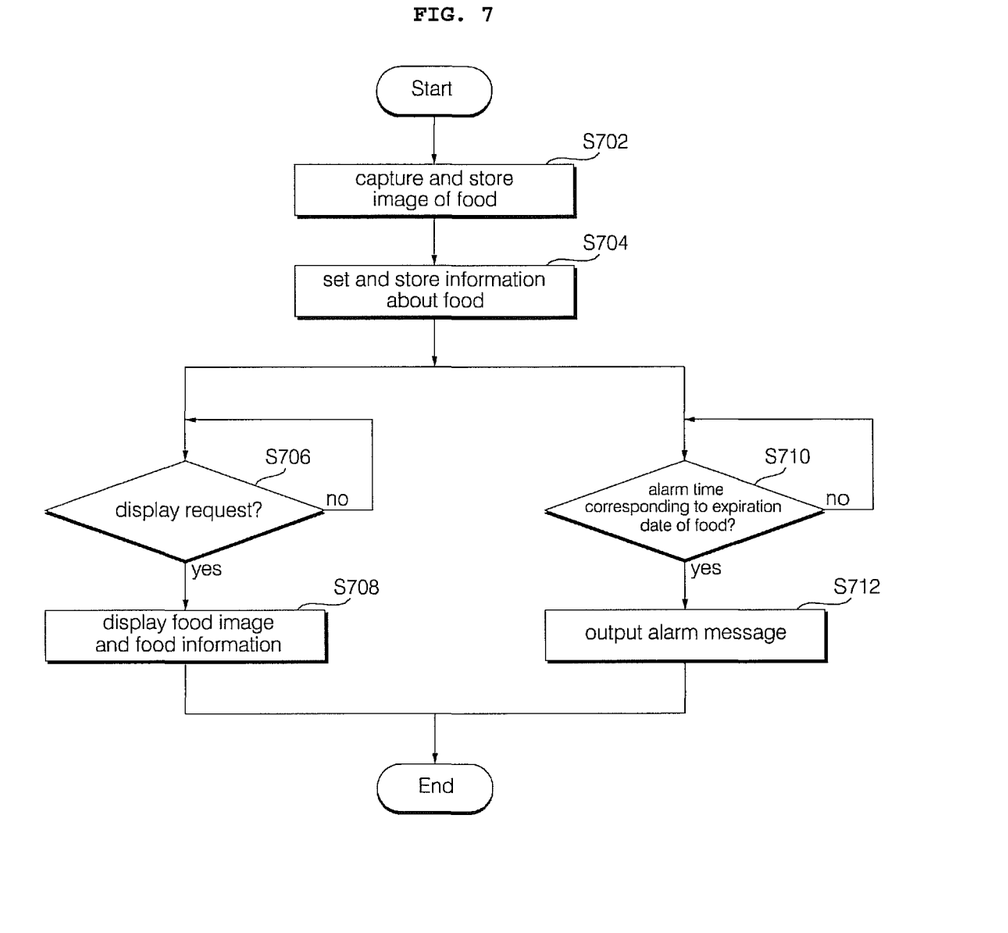
FIG. 7 is a flow chart illustrating one embodiment of a control method using a mobile terminal when a home appliance is a refrigerator, according to the present invention.

FIG. 7 is a flow chart illustrating one embodiment of a control method using a mobile terminal when a home appliance is a refrigerator, according to the present invention.

Referring to FIG. 7, the mobile terminal according to the present invention captures an image of a food to be stored in the refrigerator using the camera module and stores the captured image in the storage unit (S702).

Also, the mobile terminal according to the present invention receives and sets information about the food, for example, an expiration date, etc. from the user through the manipulating unit and stores the set information in the storage unit (S704).

Thereafter, when there is a display request from the user (S706), the mobile terminal according to the present invention displays the food image and the food information through the display unit (S708).

On the other hand, the mobile terminal according to the present invention may check an alarm time corresponding to the set expiration date of the food (5710) and output a corresponding alarm message through the alarm output module when the alarm time is reached (S712).

Figure 8:
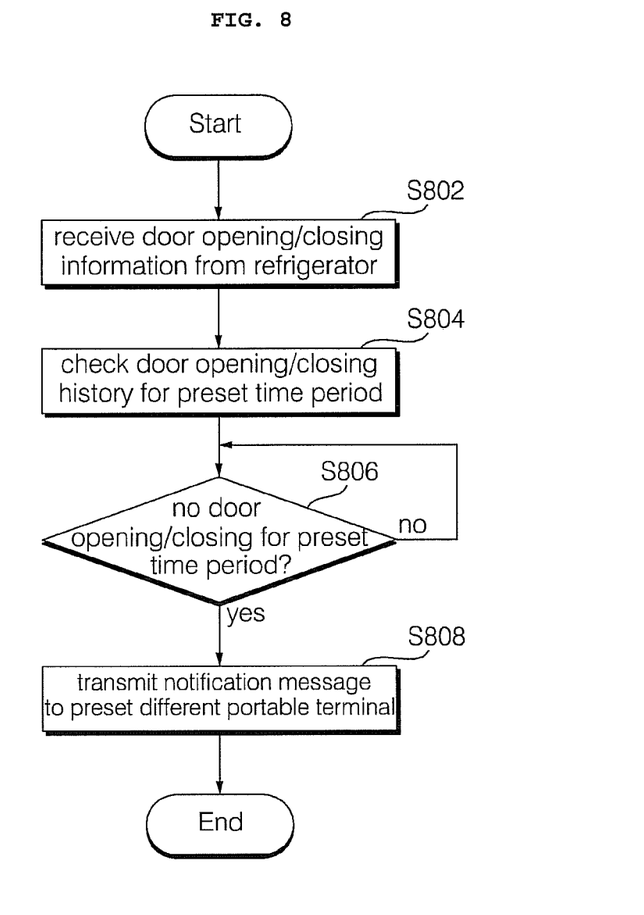
FIG. 8 is a flow chart illustrating another embodiment of the control method using the mobile terminal when the home appliance is the refrigerator, according to the present invention.

FIG. 8 is a flow chart illustrating another embodiment of the control method using the mobile terminal when the home appliance is the refrigerator, according to the present invention.

Referring to FIG. 8, the mobile terminal according to the present invention may periodically receive door opening/closing information from the refrigerator through the short-range communication module (S802).

Also, the mobile terminal according to the present invention may check a door opening/closing history for a preset period of time (for example, one week) with reference to the received door opening/closing information (5804).

Also, the mobile terminal may determine whether there is no door opening/closing for the preset time period (S806), and transmit a notification message to a preset different mobile terminal when there is no door opening/closing for the preset time period (S808). Therefore, the safety of, for example, an elderly person who lives alone may be confirmed by another person such as his/her children. In addition, the notification message may be displayed on the present mobile terminal.

On the other hand, the present invention may be implemented in a recording medium readable by a processor provided in the mobile terminal by codes readable by the processor. The processor-readable recording medium may include all types of recording media in which data readable by the processor can be stored. For example, the processor-readable recording medium may include a ROM, a RAM, a CD-ROM, a magnetic tape, a floppy disk, an optical data storage, or the like.

As is apparent from the above description, a mobile terminal according to the present invention may provide customized recommended operation information for each home appliance without separately including a device for controlling one or more home appliances.

Further, the mobile terminal may provide information about foods stored in a refrigerator among home appliances.

Moreover, the mobile terminal may selectively control any one of a plurality of home appliances.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A home appliance remotely controlled by a mobile terminal and operated based on recommended operation information, the mobile terminal comprising:
    a GPS module that receives location information;
    a mobile communication module that transmits and receives voice call signals;
    an audio output module configured to output an audio signal processed by the mobile terminal;
    a display configured to output a video signal processed by the mobile terminal;
    an interface that provides for communication between the mobile terminal and one or more external devices; and
    a controller configured to generate the recommended operation information based on state information of the home appliance and at least one of weather information, time information, season information, outdoor temperature information, indoor temperature information, or indoor humidity information,
    wherein the recommended operation information is generated based on state information of the home appliance and time information, the time information including a time at which the home appliance is to be operated, and
    wherein the home appliance is a laundry treatment apparatus, and wherein, in response to receiving the recommended operation information from the controller, a washing course is adjusted to adjust a level of noise generated by operation of the laundry treatment apparatus while performing the washing course based on a time of day the washing course is to be carried out.

2. The home appliance of claim 1, wherein the home appliance is a laundry treatment apparatus, and wherein a washing course is adjusted to decrease an amount of power consumed by the laundry treatment apparatus while performing the washing course based on a time of year the washing course is to be carried out.

3. The home appliance of claim 1, wherein the controller collects external information including the at least one of weather information, season information, outdoor temperature information, indoor temperature information, or indoor humidity information.

4. The home appliance of claim 3, wherein the external information is received via external input or is previously stored.

5. The home appliance of claim 3, wherein the controller generates the recommended operation information based on the received state information, the received time information, and the external information.

6. The home appliance of claim 5, wherein the display displays the recommended operation information.

\* \* \* \* \*